United States Patent
Hu et al.

(10) Patent No.: US 12,019,265 B1
(45) Date of Patent: Jun. 25, 2024

(54) BACKLIGHT MODULE

(71) Applicant: DARWIN PRECISIONS CORPORATION, Hsinchu County (TW)

(72) Inventors: Hsiang-I Hu, Hsinchu County (TW); Yen-Lung Chen, Hsinchu County (TW); Yu-Huan Chiu, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/210,662

(22) Filed: Jun. 16, 2023

(30) Foreign Application Priority Data

Dec. 26, 2022 (TW) ................................. 111149943

(51) Int. Cl.
G02B 6/00 (2006.01)
F21V 8/00 (2006.01)

(52) U.S. Cl.
CPC ................................. G02B 6/0053 (2013.01)

(58) Field of Classification Search
CPC .................................................. G02B 6/0053
See application file for complete search history.

(56) References Cited

U.S. PATENT DOCUMENTS

| | | | | |
|---|---|---|---|---|
| 2006/0256582 | A1* | 11/2006 | Chuang | G02B 5/045 362/620 |
| 2009/0147539 | A1* | 6/2009 | Wang | G02B 6/0053 362/623 |
| 2014/0340930 | A1* | 11/2014 | Nakagome | G02B 6/0043 362/606 |
| 2021/0181403 | A1* | 6/2021 | Chien | G02B 6/002 |

FOREIGN PATENT DOCUMENTS

| | | |
|---|---|---|
| CN | 104006353 A | 8/2014 |
| CN | 216411627 U | 4/2022 |
| TW | M628809 U | 6/2022 |

* cited by examiner

*Primary Examiner* — Julie A Bannan

(57) ABSTRACT

A backlight module includes the following features. A light guide plate has a viewing angle convergence structure, a light-incident surface and a surface connected to the light-incident surface. The viewing angle convergence structure is located at the surface. The prism plate has first prism columns and second prism columns disposed cross to each other. The inverse prism plate has third prism columns respectively having a first side surface and a second side surface. The first side surface and the second side surface are connected to each other and are respectively connected to the second surface. The first side surface faces a side of the backlight module with the light-emitting element, and the second side surface faces away from the side. An included angle between the first side surface and the second surface is larger than an included angle between the second side surface and the second surface.

10 Claims, 8 Drawing Sheets

(a)

(b)

(c)

(d)

(a)

(b)

(c)

(d)

BACKLIGHT MODULE

CROSS-REFERENCE TO RELATED APPLICATIONS

This application claims priority to Taiwan Application No. 111149943, filed on Dec. 26, 2022, which is hereby incorporated by reference for all purposes as if fully set forth herein.

FIELD OF THE INVENTION

The present disclosure relates to a light source module, and in particular to a backlight module.

BACKGROUND OF THE INVENTION

A liquid crystal display mainly includes a backlight module, a display panel and an outer frame. According to different directions of the light-emitting elements, the backlight module can be divided into an edge-lit backlight module and a direct back-lit backlight module. Generally speaking, the edge-lit backlight module is configured with a light guide plate, and the light-emitting element is disposed at an edge of the light guide plate; a light beam generated by the light-emitting element can be led by the light guide plate to emit from a light-exiting surface close to the display panel, thereby a surface light source being formed.

However, in order to increase the light-emitting brightness of the backlight module, a conventional edge-lit backlight module tends to be configured with many optical films in a light-emitting direction of the light guide plate, and it results that the conventional edge-lit backlight module is unable to be thin. In addition, a light-emitting angle of the edge-lit backlight module cannot be effectively converged by the way that the conventional optical films are configured with, and it causes an insignificant effect to increase the light-emitting brightness.

SUMMARY OF THE INVENTION

The present disclosure provides a backlight module to have the advantage of being thin, and the backlight module is further able to converge the range of a light-emitting viewing angle so as to improve the brightness and contrast.

The backlight module provided by the present disclosure includes a light-emitting element, a light guide plate, a prism plate and an inverse prism plate. The light guide plate has a light-incident surface, a light-exiting surface, a surface and a viewing angle convergence structure. The light-incident surface faces the light-emitting element. The light-exiting surface and the surface are connected to two opposite sides of the light-incident surface. The viewing angle convergence structure is located at the surface. The prism plate is disposed opposite to the light-exiting surface, and the prism plate has a first plate portion, a plurality of first prism columns and a plurality of second prism columns. The first plate portion has a first surface facing away from the light guide plate. The first prism columns and the second prism columns are disposed cross to each other on the first surface. The inverse prism plate is disposed on a side of the prism plate facing away from the light guide plate, and the inverse prism plate has a second plate portion and a plurality of third prism columns. The second plate portion has a second surface facing the prism plate. The third prism columns are located on the second surface, and the third prism columns respectively have a first side surface and a second side surface. The first side surface and the second side surface are connected to each other, and the first side surface and the second side surface are respectively connected to the second surface. The first side surface faces a side of the backlight module provided with the light-emitting element, and the second side surface faces away from the side of the backlight module provided with the light-emitting element. A first included angle is provided between the first side surface and the second surface, and a second included angle is provided between the second side surface and the second surface. The first included angle is larger than the second included angle.

In an embodiment of the present disclosure, axial directions of the first prism columns described above extend along, for example, a first direction, and the first prism columns may respectively have two third side surfaces. The two third side surfaces are connected to each other, and the two third side surfaces are respectively connected to the first surface. Axial directions of the second prism columns extend along, for example, a second direction different from the first direction, and the second prism columns may respectively have two fourth side surfaces. The two fourth side surfaces are connected to each other, and the two fourth side surfaces are respectively connected to the first surface. The third side surfaces of two adjacent the first prism columns are abutted to each other, and the fourth side surfaces of two adjacent the second prism columns are abutted to each other.

In an embodiment of the present disclosure, an included angle between the first direction and the second direction is between, for example, 60° and 90°.

In an embodiment of the present disclosure, an included angle between each of the third side surfaces and the first surface may be between 20° and 60°. An included angle between each of the fourth side surfaces and the first surface may be between 20° and 60°.

In an embodiment of the present disclosure, each of the first prism columns may further have a first vertex angle, and the two third side surfaces are connected to two opposite sides of the first vertex angle. Each of the second prism columns may have a second vertex angle, and the two fourth side surfaces are connected to two opposite sides of the second vertex angle. Each of the first vertex angles and each of the second vertex angles may include a filleted corner.

In an embodiment of the present disclosure, a radius of curvature of each of the filleted corners is less than 500 μm, for example.

In an embodiment of the present disclosure, each of the first included angles may be less than 90°, and each of the second included angles may be between 20° and 50°.

In an embodiment of the present disclosure, the viewing angle convergence structure includes, for example, a triangular column structure. An axial direction of the triangular column structure extends along the surface, and the triangular column structure has a fifth side surface and a sixth side surface. The fifth side surface and the sixth side surface are connected to each other, and the fifth side surface and the sixth side surface are respectively connected to the surface. The fifth side surface faces the side of the backlight module provided with the light-emitting element, and the sixth side surface faces away from the side of the backlight module provided with the light-emitting element. A third included angle is provided between the fifth side surface and the surface, and a fourth included angle is provided between the sixth side surface and the surface. The third included angle is larger than the fourth included angle.

In an embodiment of the present disclosure, the third included angle may be between 44° and 75°, and the fourth included angle may be between 1° and 6°.

In an embodiment of the present disclosure, a number of the viewing angle convergence structure is, for example, plural. The light guide plate has a light-incident direction opposite to a normal direction of the light-incident surface. The viewing angle convergence structures are disposed at equal intervals or unequal intervals in the light-incident direction.

In an embodiment of the present disclosure, the second plate portion of the inverse prism plate further has, for example, a third surface. The third surface faces away from the prism plate, and the third surface is opposite to the second surface. The third surface has a plurality of light-scattering microstructures.

The backlight module of the present disclosure applies the light guide plate, the prism plate and the inverse prism plate, wherein the light guide plate has the viewing angle convergence structure, the prism plate has the first prism columns and the second prism columns disposed cross to each other, and the inverse prism plate has the third prism columns with different included angles at two sides. Therefore, the light-emitting viewing angle is able to be effectively converged by the light guide plate and the prism plate, and the light-emitting viewing angle is led to a front direction of viewing angle by the inverse prism plate. Based on the descriptions above, the backlight module of the present disclosure has the advantage of a converged light-emitting viewing angle, thereby improving the brightness and contrast. In addition, the backlight module of the present disclosure is able to achieve the effect of improving the brightness by applying two optical films (such as the prism plate and the inverse prism plate) for the light guide plate, so that the backlight module of the present disclosure can also reduce the number of optical films, and the backlight module can further have the advantage of being thin.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
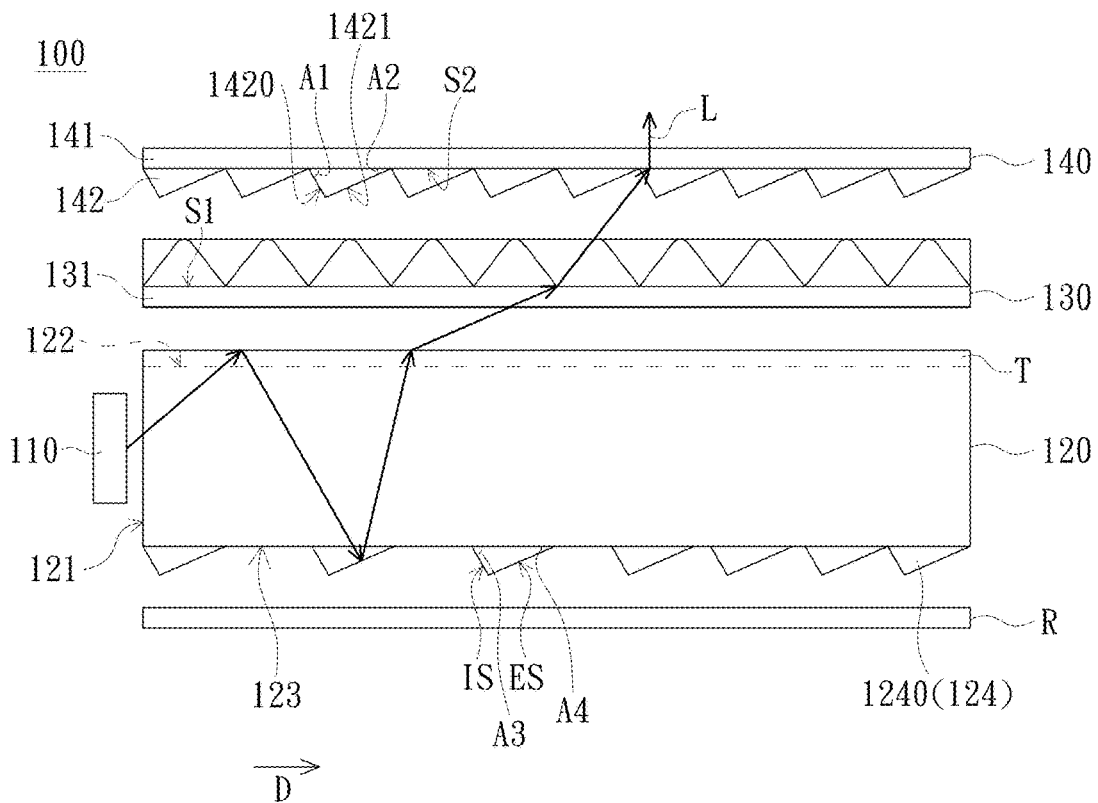
FIG. 1 is a schematic diagram of a backlight module according to an embodiment of the present disclosure.
Figure 2:
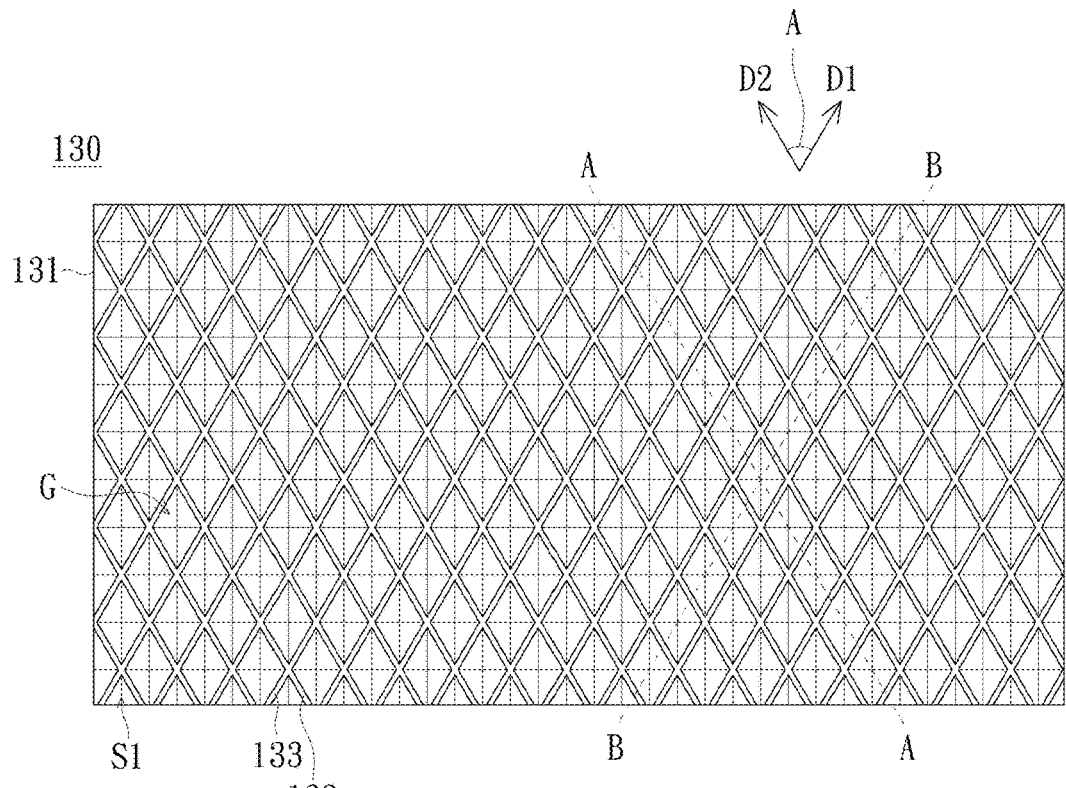
FIG. 2 is a schematic diagram of a top view of a prism plate of FIG. 1.

FIG. 1 is a schematic diagram of a backlight module according to an embodiment of the present disclosure. FIG. 2 is a schematic diagram of a top view of a prism plate of FIG. 1. With reference to FIG. 1 and FIG. 2, the backlight module 100 includes a light-emitting element 110, a light guide plate 120, a prism plate 130 and an inverse prism plate 140. The light guide plate 120 has a light-incident surface 121, a light-exiting surface 122, a surface 123 and a viewing angle convergence structure 124. The light-incident surface 121 faces the light-emitting element 110. The light-exiting surface 122 and the surface 123 are connected to two opposite sides of the light-incident surface 121. The viewing angle convergence structure 124 is located at the surface 123. The prism plate 130 is disposed opposite to the light-exiting surface 122, and the prism plate 130 has a first plate portion 131, a plurality of first prism columns 132 and a plurality of second prism columns 133. The first plate portion 131 has a first surface S1 facing away from the light guide plate 120. The first prism columns 132 and the second prism columns 133 are disposed cross to each other on the first surface S1. The inverse prism plate 140 is disposed on a side of the prism plate 130 facing away from the light guide plate 120, and the inverse prism plate 140 has a second plate portion 141 and a plurality of third prism columns 142. The second plate portion 141 has a second surface S2 facing the prism plate 130. The third prism columns 142 are located on the second surface S2, and the third prism columns 142 respectively have a first side surface 1420 and a second side surface 1421. The first side surface 1420 and the second side surface 1421 are connected to each other, and the first side surface 1420 and the second side surface 1421 are respectively connected to the second surface S2. The first side surface 1420 faces a side of the backlight module 100 provided with the light-emitting element 110, and the second side surface 1421 faces away from the side of the backlight module 100 provided with the light-emitting element 110. A first included angle A1 is provided between the first side surface 1420 and the second surface S2, and a second included angle A2 is provided between the second side surface 1421 and the second surface S2. The first included angle A1 is larger than the second included angle A2.

With continued reference to FIG. 1, the light-emitting element 110 may include a light-emitting diode, but in other embodiments, the light-emitting element 110 may also be other types of light-emitting elements. In addition, in an embodiment, the light-emitting element 110 may be an unpackaged light-emitting chip cut from a wafer, such as a light-emitting diode chip. For example, the light-emitting diode chip can be a grain-level nitride light-emitting diode chip that emits blue light at a dominant wavelength, but the present disclosure is not limited thereto. In addition, the light-emitting element 110 in this embodiment can be disposed in arrays, and the number of the light-emitting elements 110 is not limited in the present disclosure.

In this embodiment, since the light guide plate 120 has the viewing angle convergence structure 124, the light guide plate 120 is able to effectively converge the light-emitting viewing angle of the light-exiting surface 122. For example, in an embodiment, an included angle between a light beam L and a normal direction of the light-exiting surface 122 is about 70°, and a distribution range of the angle of the energy of the light emitting from the light-exiting surface 122 is converged at about +/−20° (between about 50° and 90°), but these details are not limited in the present disclosure. The viewing angle convergence structure 124 in this embodiment includes, for example, a triangular column structure 1240. An axial direction of the triangular column structure 1240 extends along the surface 123, and the triangular column structure has a side surface IS (a fifth side surface) and a side surface ES (a sixth side surface). The side surfaces IS and ES are connected to each other, and the side surfaces IS and ES are respectively connected to the surface 123. The side surface IS faces a side of the backlight module 100 provided with the light-emitting element 110, and the side surface ES faces away from the side of the backlight module 100 provided with the light-emitting element 110. A third included angle A3 is provided between the side surface IS and the surface 123, and a fourth included angle A4 is provided between the side surface ES and the surface 123. The third included angle A3 is larger than the fourth included angle A4. In detail, since the side surface ES is struck by most of the light beams generated by the light-emitting element 110, the side surface ES may be inclined more toward the surface 123 than the side surface IS so as to converge the energy of the light beam L emitted from the light-exiting surface 122. For example, in an embodiment, the fourth included angle A4 may be between 1° and 6°, so as to further converge the light-emitting viewing angle of the light beam L emitted from the light-exiting surface 122. In this embodiment, a number of the viewing angle convergence structure 124 is, for example, plural. The light guide plate 120 has a light-incident direction D which is, for example, substantially opposite to a normal direction of the light-incident surface 121. The viewing angle convergence structures 124 are disposed at unequal intervals in the light-incident direction D to improve the uniformity of the light emitted from the light-exiting surface 122. For example, the light beam L enters the light guide plate 120 from the light-incident surface 121, and therefore, a distance between a part of the viewing angle convergence structures 124 located near the light-incident surface 121 can be larger than a distance between a part of the viewing angle convergence structures 124 located far away from the light-incident surface 121, so that the brightness of the light beam L emitted from the light-exiting surface 122 can be more consistent from a side near the light-incident surface 121 to a side far away from the light-incident surface 121. Incidentally, the light-exiting surface 122 of the light guide plate 120 may further be provided with a prism column T to further adjust the emitting path of the light beam L.

Figure 3:
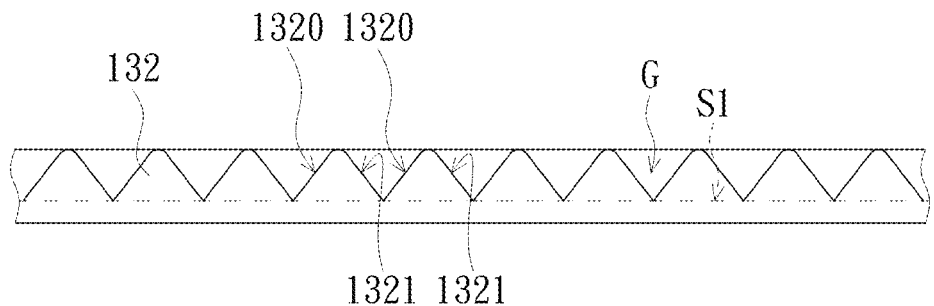
FIG. 3 is a schematic diagram of a sectional view taken along a section line A-A of FIG. 2.
Figure 4:
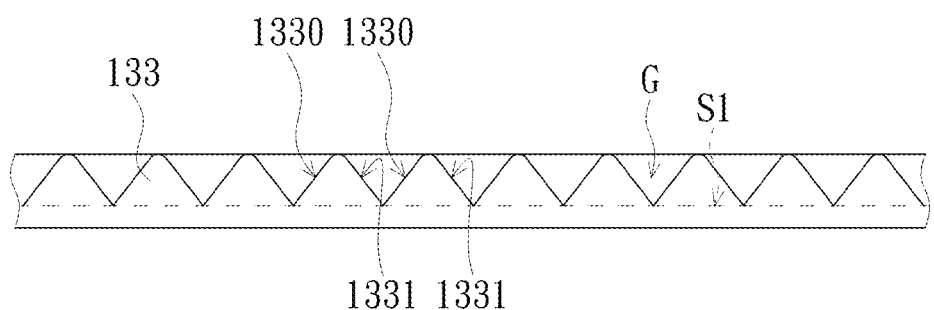
FIG. 4 is a schematic diagram of a sectional view taken along a section line B-B of FIG. 2.
Figure 5:
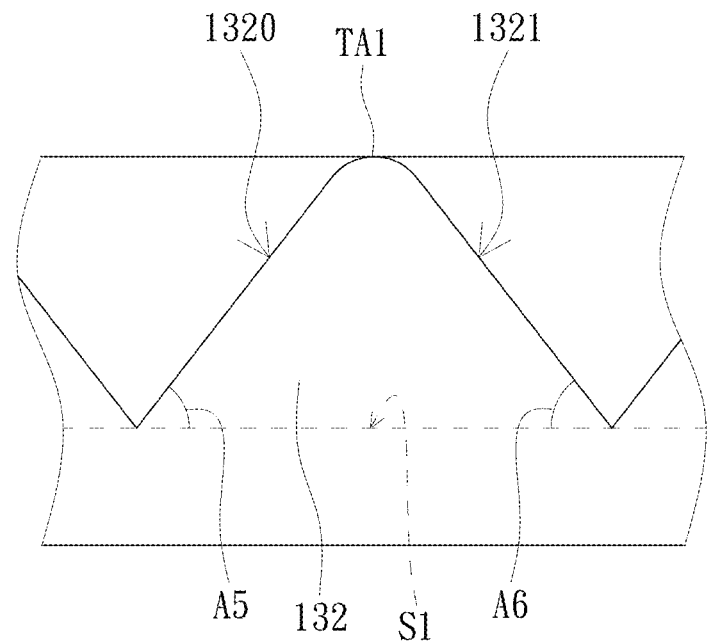
FIG. 5 is an enlarged schematic diagram of a first prism column of FIG. 3.
Figure 6:
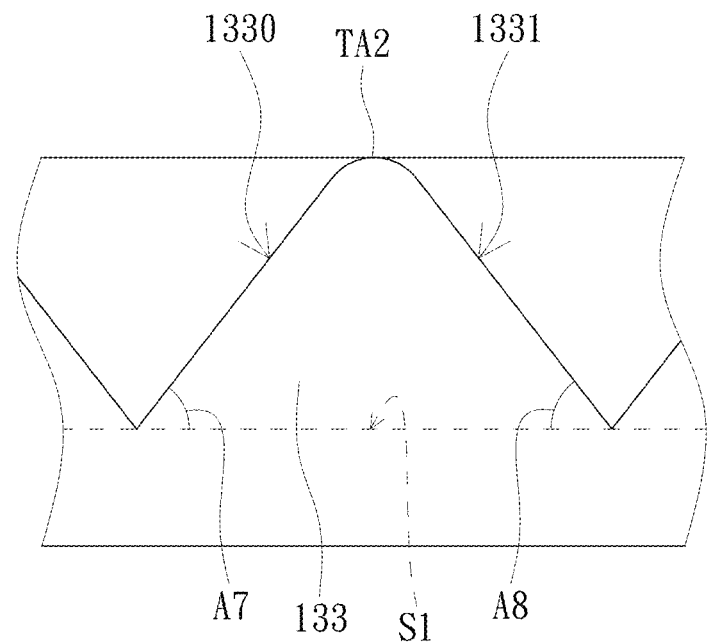
FIG. 6 is an enlarged schematic diagram of the first prism column of FIG. 4.

FIG. 3 is a schematic diagram of a sectional view taken along a section line A-A of FIG. 2. FIG. 4 is a schematic diagram of a sectional view taken along a section line B-B of FIG. 2. FIG. 5 is an enlarged schematic diagram of a first prism column of FIG. 3. FIG. 6 is an enlarged schematic diagram of the first prism column of FIG. 4. With continued reference to FIG. 1 and FIG. 2 together, the prism plate 130 has the first prism columns 132 and the second prism columns 133 disposed cross to each other, so that the energy of the light beam L emitted from the prism plate 130 can be further converged after the light beam L passes through the prism plate 130. For example, in an embodiment, an angle at which the light beam L is emitted from the prism plate 130 may be about 50°, and a distribution range of the angle of the energy of the light emitting from the prism plate 130 may be converged at +/−15° (between about 35° and 65°), but these details are not limited in the present disclosure. With reference to FIG. 2 and FIG. 3 together, in this embodiment, axial directions of the first prism columns 132 extend, for example, along a first direction D1, and the first prism columns 132 may respectively have third side surfaces 1320 and 1321. The third side surfaces 1320 and 1321 are connected to each other, and the third side surfaces 1320 and 1321 are respectively connected to the first surface S1. The third side surfaces 1320 and 1321 of two adjacent the first prism columns 132 are abutted to each other. On the other hand, as shown in FIG. 2 and FIG. 4, axial directions of the second prism columns 133 extend, for example, along a second direction D2 different from the first direction D1, and the second prism columns 133 may respectively have fourth side surfaces 1330 and 1331. The fourth side surfaces 1330 and 1331 are connected to each other, and the fourth side surfaces 1330 and 1331 are respectively connected to the first surface S1. The fourth side surfaces 1330 and 1331 of two adjacent the second prism columns 133 are abutted to each other. Based on the above structure, the prism plate 130 can further converge the light-emitting viewing angle of the light beam L (shown in FIG. 1). In detail, as shown in FIG. 3 and FIG. 4, the two adjacent first prism columns 132 are abutted to each other, and the two adjacent second prism columns 133 are also abutted to each other; furthermore, as shown in FIG. 2, a groove G (also labeled in FIG. 3 and FIG. 4) in a shape of a quadrangular pyramid is formed in an area surrounded by the two adjacent first prism columns 132 and the two adjacent second prism columns 133. In addition, in an embodiment, an included angle A between the first direction D1 and the second direction D2 is, for example, between 60° and 90°, so that the prism plate 130 can reduce the occurrence of stray light.

In addition, with reference to FIG. 5 and FIG. 6, an included angle A5 between the third side surface 1320 and the first surface S1 may be between 20° and 60°, and an included angle A6 between the third side surface 1321 and the first surface S1 may be between 20° and 60°; similarly, an included angle A7 between the fourth side surface 1330 and the first surface S1 may be between 20° and 60°, and an included angle A8 between the fourth side surface 1331 and the first surface S1 may be between 20° and 60°. Therefore, the light-emitting viewing angle of the light beam L emitted from the prism plate 130 can be further converged. Incidentally, in an embodiment, the included angles A5 and A6 may be the same; similarly, in another embodiment, the included angles A7 and A8 may be the same. In addition, each of the first prism columns 132 in this embodiment may also have a first vertex angle TA1, and the third side surfaces 1320 and 1320 are connected to two opposite sides of the first vertex angle TA1. Similarly, each of the second prism columns 133 may also have a second vertex angle TA2, and the fourth side surfaces 1330 and 1331 are connected to two opposite sides of the second vertex angle TA2. Each of the first vertex angles TA1 and each of the second vertex angles TA2 may include a filleted corner, so that the occurrence of the stray light can be reduced by the prism plate 130. For example, in an embodiment, a radius of curvature of each filleted corner is, for example, less than 500 μm, but the present disclosure is not limited thereto.

Figure 7:
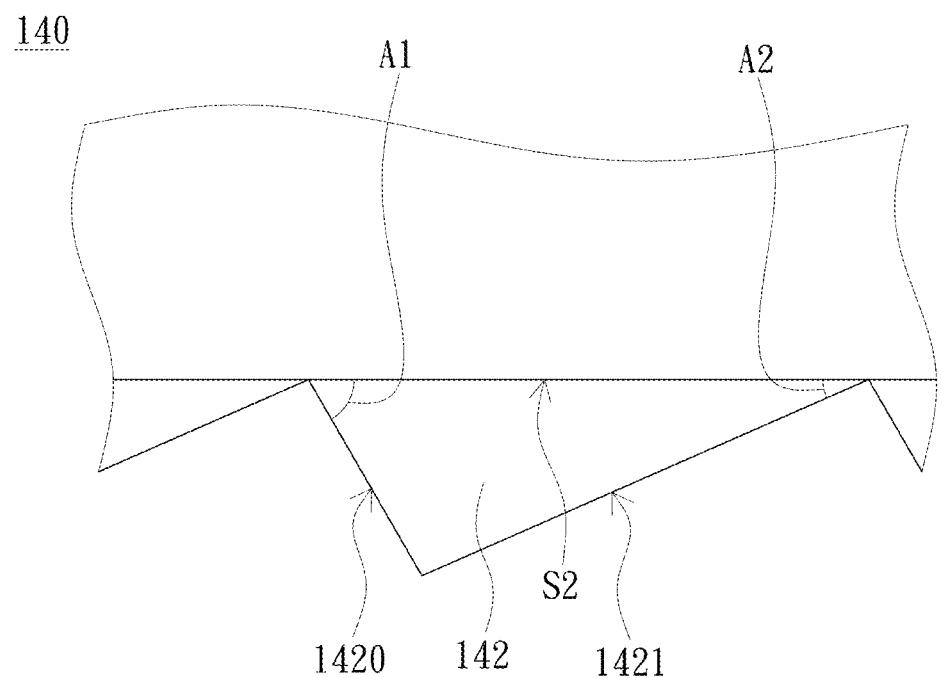
FIG. 7 is an enlarged schematic diagram of a third prism column of an inverse prism plate of FIG. 1.

FIG. 7 is an enlarged schematic diagram of a third prism column of an inverse prism plate of FIG. 1. With reference to FIG. 1 and FIG. 7 together, the inverse prism plate 140 in this embodiment has a plurality of third prism columns 142, and for each of the third prism columns 142, the first included angle A1 is larger than the second included angle A2, so that the second side surface 1421 can be inclined more toward the second surface S2 than the first side surface 1420. Based on the above structure, after the light beam L passes through the inverse prism plate 140, the light-emitting angle of the light beam L can be led to a front direction of the viewing angle by the inverse prism plate 140. For example, in an embodiment, the light-emitting angle of the light beam L emitted from the inverse prism plate 140 may be about 0°, that is, the light beam L may be emitted from the inverse prism plate 140 in a direction close to a normal direction of the viewing angle, but the specific light-emitting angle is not limited in the present disclosure. With continued reference to FIG. 7, in this embodiment, each of the first included angles A1 may be less than 90°, and each of the second included angles A2 may be between 20° and 50°.

Compared with the prior art, the backlight module 100 in this embodiment applies the light guide plate 120, the prism plate 130 and the inverse prism plate 140, wherein the light guide plate 120 has the viewing angle convergence structure 124, the prism plate 130 has the first prism columns 132 and the second prism columns 133 disposed cross to each other, and the inverse prism plate 140 has the third prism columns 142 with different included angles at two sides. Therefore, the light-emitting viewing angle is able to be effectively converged by the light guide plate 120 and the prism plate 130, and the light-emitting viewing angle is led to a front direction of the viewing angle by the inverse prism plate 140. Based on the descriptions above, the backlight module 100 has the advantage of a converged light-emitting viewing angle, thereby improving the brightness and contrast. In addition, the backlight module 100 in this embodiment is able to achieve the effect of improving the brightness by applying two optical films (such as the prism plate 130 and the inverse prism plate 140) for the light guide plate 120, so that the backlight module 100 can also reduce the number of optical films, and the backlight module 100 further has the advantage of being thin.

Figure 8:
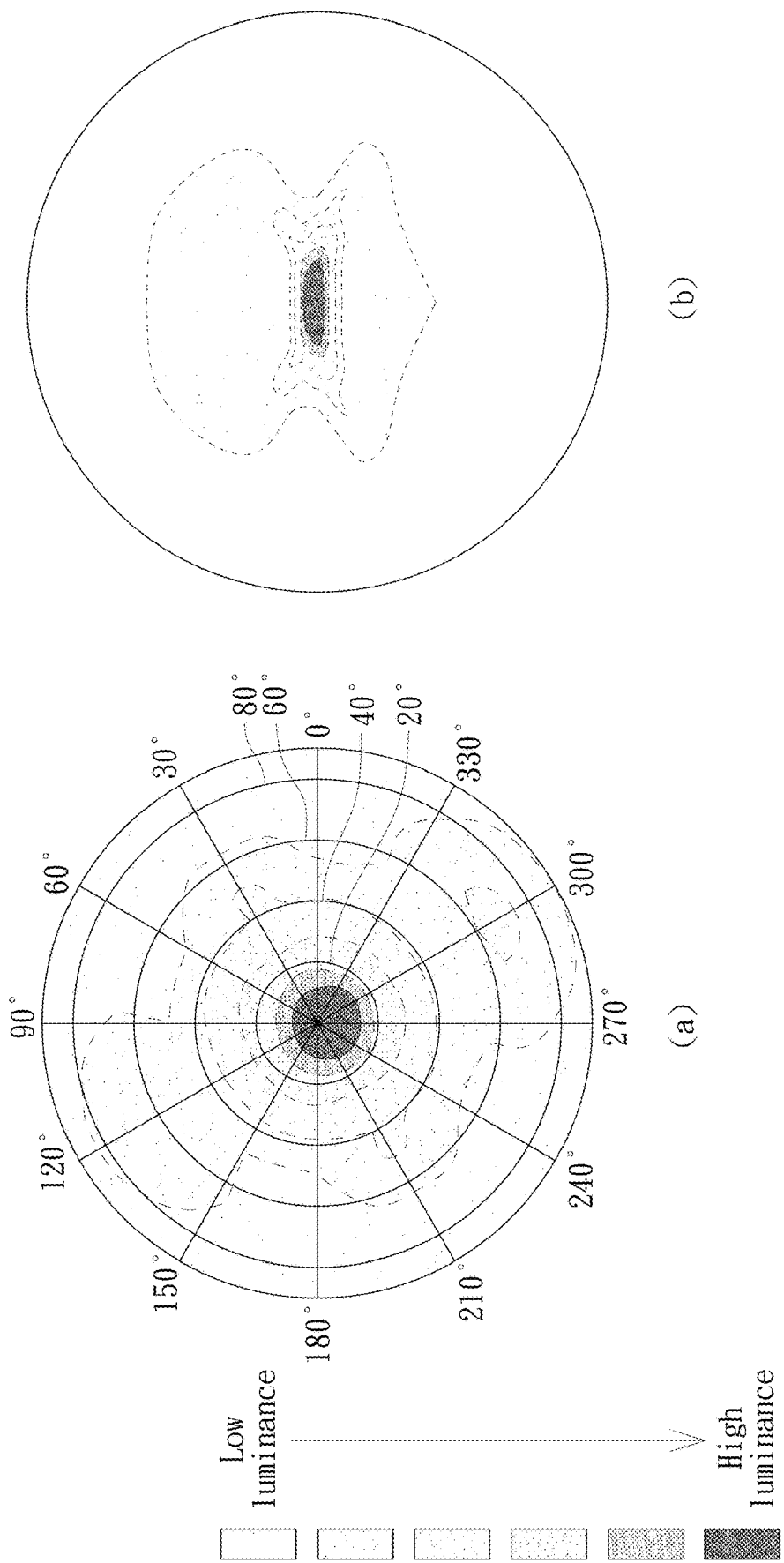
FIG. 8 is a schematic diagram of light-emitting fields of view of a conventional backlight module and the backlight module of the present disclosure.
Figure 9:
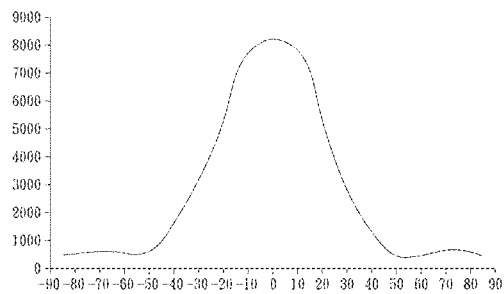
FIG. 9 is a schematic diagram of light-emitting viewing angles of the conventional backlight module and the backlight module of the present disclosure on a horizontal axis and a vertical axis.
Figure 9:
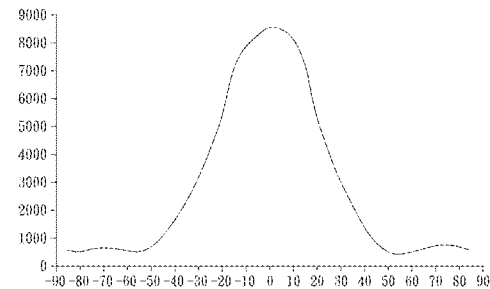
Figure 9:
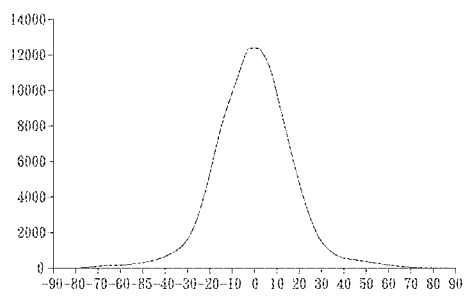
Figure 9:
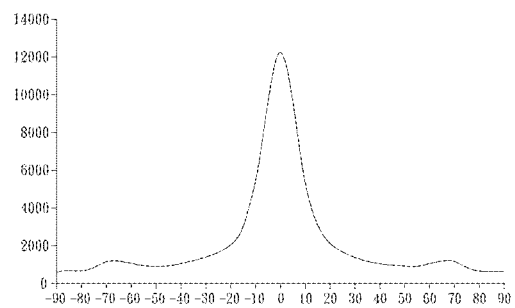

FIG. 8 is a schematic diagram of light-emitting fields of view of a conventional backlight module and the backlight module of the present disclosure. FIG. 9 is a schematic diagram of light-emitting viewing angles of the conventional backlight module and the backlight module of the present disclosure on a horizontal axis and a vertical axis. In detail, FIG. 8 (a) shows a schematic diagram of a light-emitting field of view of a conventional backlight module, and (b) shows a schematic diagram of the light-emitting field of view of the backlight module of the present disclosure. Compared with the conventional backlight module, the light-emitting angle of the backlight module of the present disclosure is obviously more converged than that of the conventional backlight module. On the other hand, FIG. 9 (a) shows a schematic diagram of the light-emitting viewing angle of the conventional backlight module in a horizontal axis direction, (b) shows a schematic diagram of the light-emitting viewing angle of the conventional backlight module in a vertical axis direction, (c) shows a schematic diagram of the light-emitting viewing angle of a backlight module of the present disclosure in the horizontal axis direction, and (d) shows a schematic diagram of the light-emitting viewing angle of the backlight module of the present disclosure in the vertical axis direction. Compared with the conventional backlight module, the light-emitting viewing angles of the backlight module of the present disclosure in the horizontal axis direction and the vertical axis direction can be effectively converged.

Figure 10:
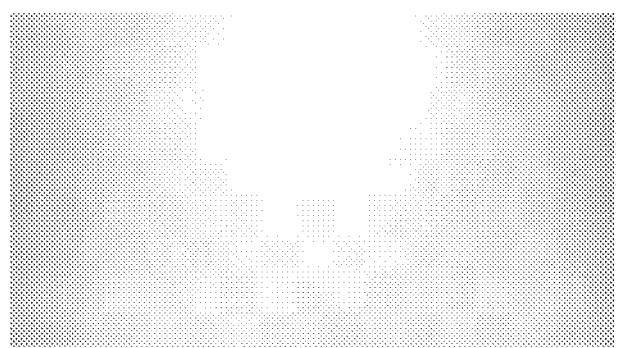
FIG. 10 is a schematic diagram for simulating hot spots on a light-exiting surface of the conventional backlight module and the backlight module of the present disclosure.
Figure 10:
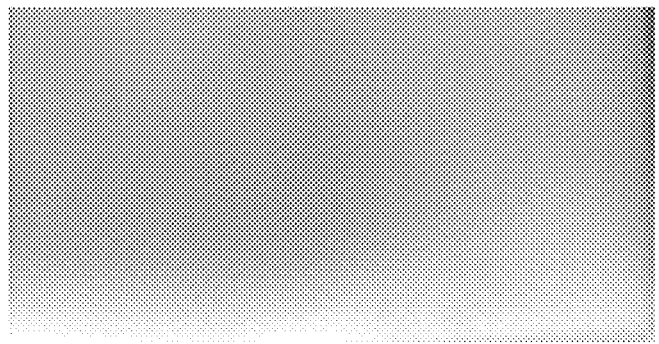
Figure 10:
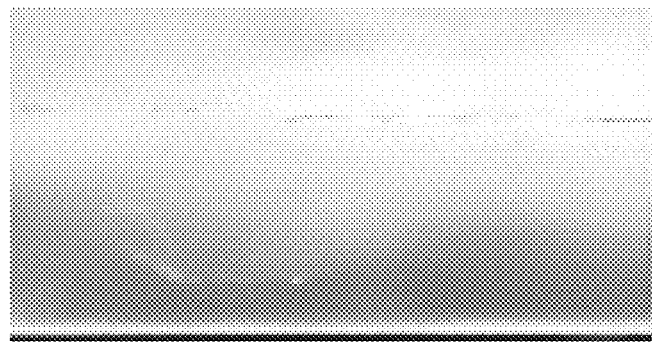
Figure 10:
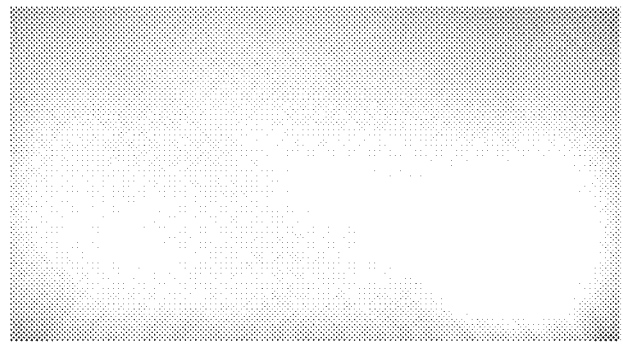

FIG. 10 is a schematic diagram for simulating hot spots on a light-exiting surface of the conventional backlight module and the backlight module of the present disclosure. As shown in FIG. 10, (a), (c) and (d) show schematic diagrams for simulating hot spots on a light-exiting surface of a conventional light guide plate, and (b) is a schematic diagram for simulating hot spots on the light-exiting surface of the light guide plate of the present disclosure. Compared with the conventional light guide plate, the hot spots on the light-exiting surface of the light guide plate can be effectively reduced by the backlight module of the present disclosure on the premise of reducing the thickness, so that the light-emitting brightness of the light-exiting surface is more uniform, thereby the light guide plate providing a better optical grade. For example, the display devices presented in Table 1 respectively apply the conventional backlight module and the backlight module of the present disclosure, and compared with the conventional backlight module, the image quality can be significantly improved by the backlight module of the present disclosure.

TABLE 1

| | Parameter of image | | |
| --- | --- | --- | --- |
| | Brightness | Full width at half maximum (FWHM) | Contrast |
| A display device applying a conventional backlight module | 100% | 45° | 1:1300 |
| A display device applying a backlight module of the present disclosure | 160% | 20° | 1:2500 |

Incidentally, with reference to FIG. 1 again, the backlight module 100 may further include a reflective sheet R. The reflective sheet R is disposed on a side of the light guide plate 120 facing away from the prism plate 130, so as to increase a light utilization rate. In this embodiment, a material of the reflective sheet R may include silver, but other embodiments are not limited thereto. It can be understood that in other embodiments, the backlight module 100 can also be provided with other optical films, and the optical films include, for example, a diffusion film, a brightness enhancement films, a multifunction film, but the present disclosure is not limited thereto.

Figure 11:
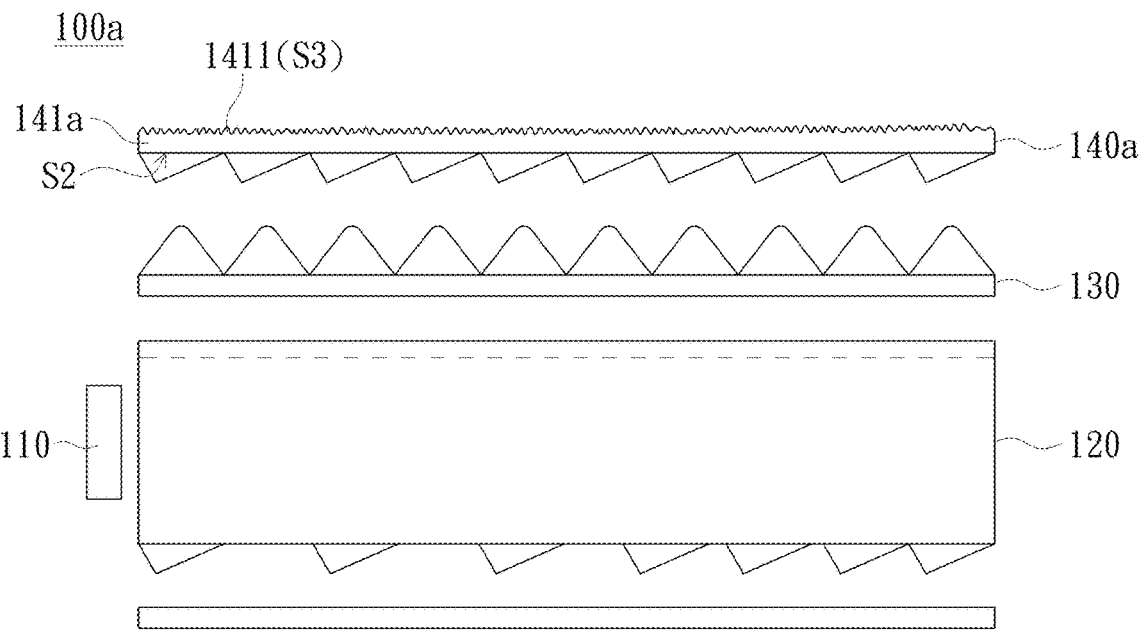
FIG. 11 is a schematic diagram of a backlight module according to another embodiment of the present disclosure.

FIG. 11 is a schematic diagram of a backlight module according to another embodiment of the present disclosure. The structure and advantages of the backlight module 100a in this embodiment are similar to those of the embodiment in FIG. 1, and the differences are described hereinafter. With reference to FIG. 11, the second plate portion 141a of the inverse prism plate 140a further has, for example, a third surface S3. The third surface S3 faces away from the prism plate 130, and the third surface S3 is opposite to the second surface S2. The third surface S3 has a plurality of light-scattering microstructures 1411, so that the light emitted from the backlight module 100a is more uniform. Specifically, the third surface S3 may be roughened to have haze.

Figure 12:
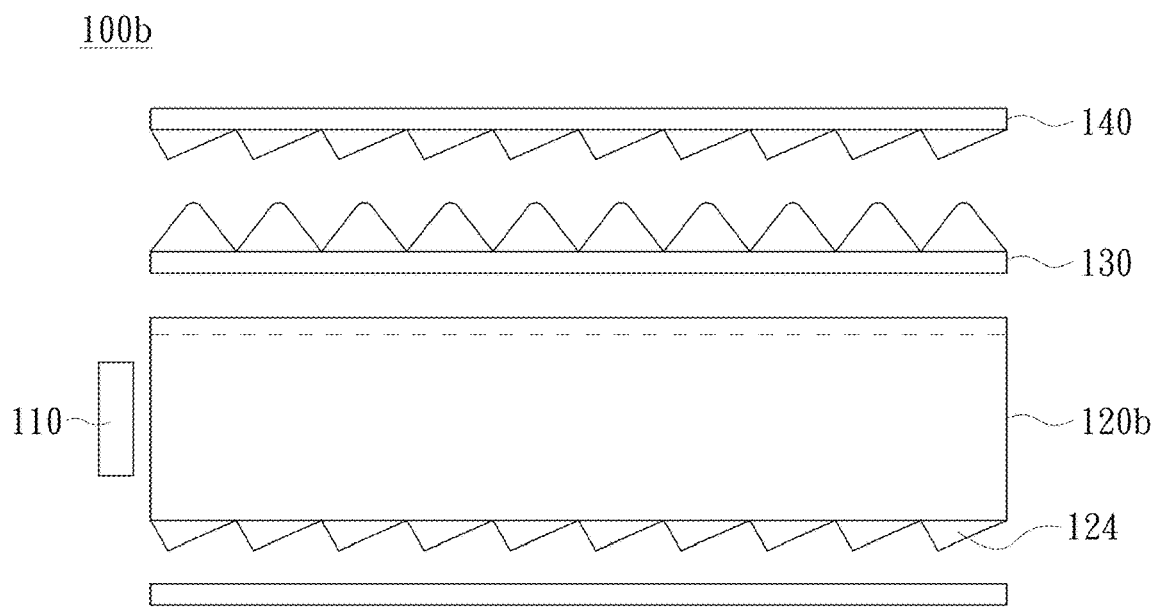
FIG. 12 is a schematic diagram of a backlight module according to another embodiment of the present disclosure.

FIG. 12 is a schematic diagram of a backlight module according to another embodiment of the present disclosure. The structure and advantages of the backlight module 100d in this embodiment are similar to those of the embodiment of FIG. 1, and the differences are described hereinafter. With reference to FIG. 12, the viewing angle convergence structures 124 of the light guide plate 120d can be disposed at equal intervals in the light-incident direction D. In this way, the light guide plate 120d may have the advantage of easiness in processing.

In summary, the backlight module of the present disclosure applies the light guide plate, the prism plate and the inverse prism plate, wherein the light guide plate has the viewing angle convergence structure, the prism plate has the first prism columns and the second prism columns cross to each other, and the inverse prism plate has the third prism columns with different included angles at two sides. Therefore, the light-emitting viewing angle is able to be effectively converged by the light guide plate and the prism plate, and the light-emitting viewing angle is led to be the front direction of the viewing angle by the inverse prism plate. Based on the descriptions above, the backlight module of the present disclosure has the advantage of a converged light-emitting viewing angle, thereby improving the brightness and contrast. In addition, the backlight module of the present disclosure is able to achieve the effect of improving the brightness by applying two optical films (such as the prism plate and the inverse prism plate) for the light guide plate, so that the backlight module of the present disclosure can also reduce the number of optical films, and the backlight module further has the advantage of being thin.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising:
a light-emitting element;
a light guide plate having a light-incident surface, a light-exiting surface, a surface and a viewing angle convergence structure, the light-incident surface facing the light-emitting element, the light-exiting surface and the surface connected to two opposite sides of the light-incident surface, and the viewing angle convergence structure located at the surface; wherein:
the viewing angle convergence structure comprises a triangular column structure, an axial direction of the triangular column structure extends along the surface, and the triangular column structure has a fifth side surface and a sixth side surface, the fifth side surface and the sixth side surface are connected to each other, and the fifth side surface and the sixth side surface are respectively connected to the surface, the fifth side surface faces the side of the backlight module provided with the light-emitting element, and the sixth side surface faces away from the side of the backlight module provided with the light-emitting element, a third included angle is provided between the fifth side surface and the surface, a fourth included angle is provided between the sixth side surface and the surface, and the third included angle is larger than the fourth included angle;
a prism plate disposed opposite to the light-exiting surface, and the prism plate having a first plate portion, a plurality of first prism columns and a plurality of second prism columns, the first plate portion having a first surface facing away from the light guide plate, and the first prism columns and the second prism columns disposed cross to each other on the first surface; and
an inverse prism plate disposed on a side of the prism plate facing away from the light guide plate, and the inverse prism plate having a second plate portion and a plurality of third prism columns, the second plate portion having a second surface facing the prism plate, the third prism columns located on the second surface, and the third prism columns respectively having a first side surface and a second side surface, the first side surface and the second side surface connected to each other, and the first side surface and the second side surface respectively connected to the second surface, the first side surface facing a side of the backlight module provided with the light-emitting element, and the second side surface facing away from the side of the backlight module provided with the light-emitting element, wherein a first included angle is provided between the first side surface and the second surface, a second included angle is provided between the second side surface and the second surface, and the first included angle is larger than the second included angle.

2. The backlight module according to claim 1, wherein axial directions of the first prism columns extend along a first direction, and the first prism columns respectively have two third side surfaces, the two third side surfaces are connected to each other, and the two third side surfaces are respectively connected to the first surface, axial directions of the second prism columns extend along a second direction different from the first direction, and the second prism columns respectively have two fourth side surfaces, the two fourth side surfaces are connected to each other, and the two fourth side surfaces are respectively connected to the first surface, the third side surfaces of two adjacent the first prism columns are abutted to each other, and the fourth side surfaces of two adjacent the second prism columns are abutted to each other.

3. The backlight module according to claim 2, wherein an included angle between the first direction and the second direction is between 60° and 90°.

4. The backlight module according to claim 2, wherein an included angle between each of the third side surfaces and the first surface is between 20° and 60°, and an included angle between each of the fourth side surfaces and the first surface is between 20° and 60°.

5. The backlight module according to claim 2, wherein each of the first prism columns further has a first vertex angle, the two third side surfaces are connected to two opposite sides of the first vertex angle, each of the second prism columns further has a second vertex angle, the two fourth side surfaces are connected to two opposite sides of the second vertex angle, and each of the first vertex angles and each of the second vertex angles comprise a filleted corner.

6. The backlight module according to claim 5, wherein a radius of curvature of each of the filleted corners is less than 500 μm.

7. The backlight module according to claim 1, wherein each of the first included angles is less than 90°, and each of the second included angles is between 20° and 50°.

8. The backlight module according to claim 1, wherein the third included angle is between 44° and 75°, and the fourth included angle is between 1° and 6°.

9. The backlight module according to claim 1, wherein a number of the viewing angle convergence structure is plural, the light guide plate has a light-incident direction, and the light-incident direction is opposite to a normal direction of the light-incident surface, and the viewing angle convergence structures are disposed at equal intervals or unequal intervals in the light-incident direction.

10. The backlight module according to claim 1, wherein the second plate portion of the inverse prism plate further has a third surface, the third surface faces away from the prism plate, and the third surface is opposite to the second surface, and the third surface has a plurality of light-scattering microstructures.

* * * * *